(12) United States Patent
Dohle

(10) Patent No.: US 6,869,127 B2
(45) Date of Patent: Mar. 22, 2005

(54) TEMPORARY REPLACEMENT WINDOW

(76) Inventor: Bobby A. Dohle, 4838 W. Newell, Wichita, KS (US) 67212

(*) Notice: Subject to any disclaimer, the term of this patent is extended or adjusted under 35 U.S.C. 154(b) by 0 days.

(21) Appl. No.: 10/434,375

(22) Filed: May 9, 2003

(65) Prior Publication Data

US 2004/0222662 A1 Nov. 11, 2004

(51) Int. Cl.$^7$ .................................................. B60J 1/08
(52) U.S. Cl. ................................ 296/146.1; 296/146.2; 296/152; 160/354; 160/90
(58) Field of Search .............................. 296/146.1, 201, 296/146.5, 146.2, 146.15; 49/502, 501, 504; 52/208, 202, 204.1, 204.593, 204.597, 476, 656.5; 160/23.1, 90

(56) References Cited

U.S. PATENT DOCUMENTS

| | | | | |
|---|---|---|---|---|
| 2,619,168 A | * | 11/1952 | Leverence | 160/354 |
| 2,665,754 A | * | 1/1954 | Claussen et al. | 160/354 |
| 2,937,700 A | * | 5/1960 | Gibbons | 160/90 |
| 3,085,621 A | * | 4/1963 | Meranto | 160/90 |
| 3,749,147 A | * | 7/1973 | Hess et al. | 160/354 |
| 4,139,233 A | * | 2/1979 | Bott | 160/354 |
| 5,044,776 A | * | 9/1991 | Schramer et al. | 383/89 |
| 5,524,694 A | * | 6/1996 | Arapis | 296/152 |
| 5,605,369 A | * | 2/1997 | Ruiz | 296/136.07 |
| 5,857,730 A | * | 1/1999 | Korpi et al. | 296/146.1 |
| 5,879,048 A | * | 3/1999 | Tower | 160/354 |
| 6,063,477 A | * | 5/2000 | Ames et al. | 428/192 |
| 6,145,573 A | * | 11/2000 | Chen | 296/152 |
| 6,352,299 B1 | | 3/2002 | Ames et al. | 296/146.2 |
| 6,367,536 B1 | | 4/2002 | St Louis | 296/152 |
| 6,561,568 B1 | | 5/2003 | Gray | 296/146.2 |

* cited by examiner

Primary Examiner—Kiran Patel
(74) Attorney, Agent, or Firm—Bradley P. Sylvester

(57) ABSTRACT

A temporary replacement allows a sheet of material to be affixed in place of the glass portion of a vehicle door window. The sheet of material may also be held in place using magnetic strips, that effectively fasten the material to the metal portion of the vehicle door. The material used may be transparent, translucent, or a mesh design, that allows the free flow of air.

The temporary replacement window may have a single sheet configuration, or have a bag like configuration. The single sheet configuration is placed on the outer or external side of the vehicle window, with the sheet wrapping around the window frame. An elastic strap, defined around the sheet's peripheral edge restricts the diameter of its opening to a measurement less than the window frame. A bottom elastic strip may be used to hold the bottom of the sheet against the bottom of the window frame. Another configuration uses a bag, having a mouth that is able to allow the insertion of the vehicle window frame. The window frame is inserted into the bag, and the bottom of the bag is secured to the bottom portion of the window frame. This temporary replacement window offers quick attachment and removal as desired.

7 Claims, 5 Drawing Sheets

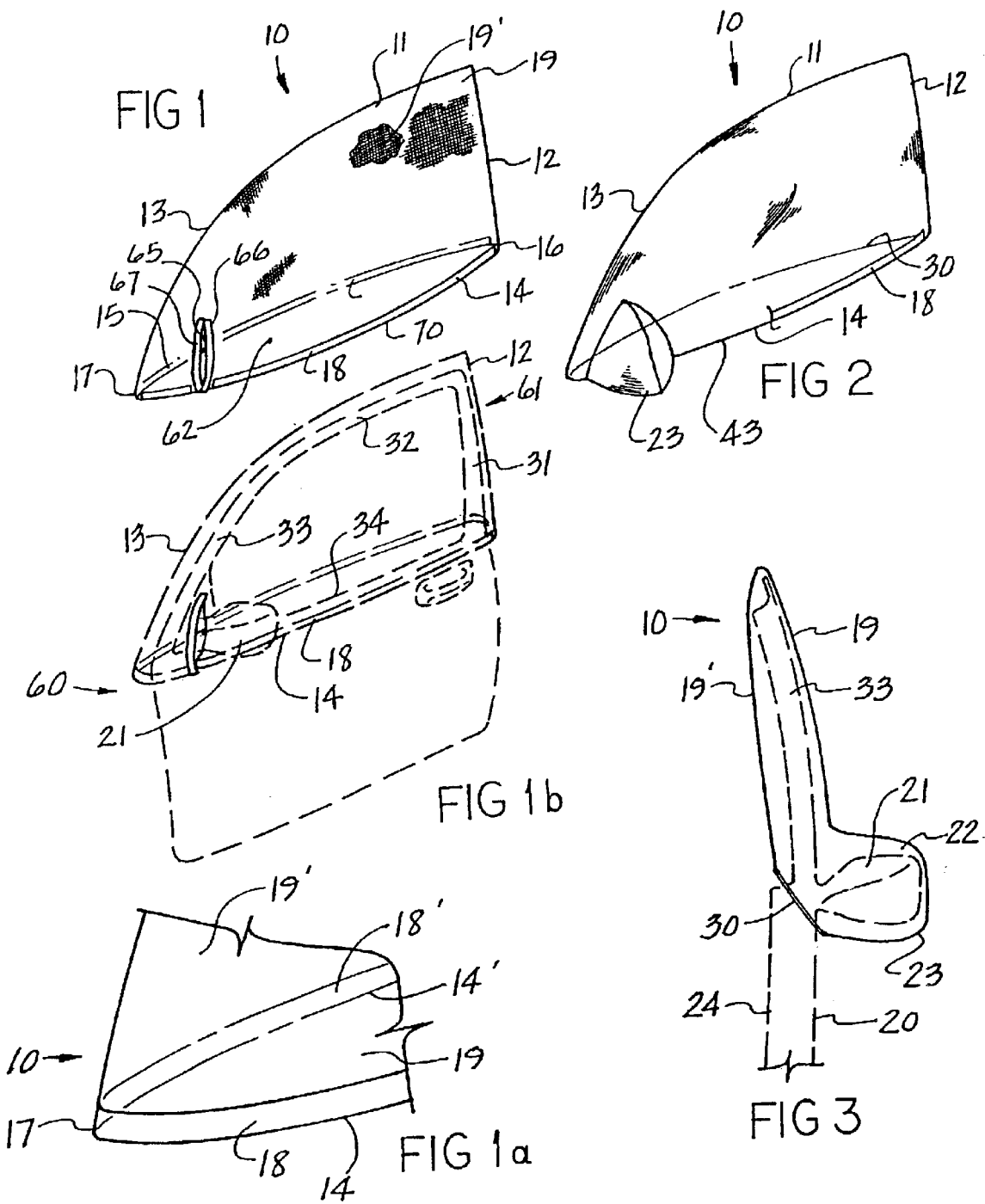

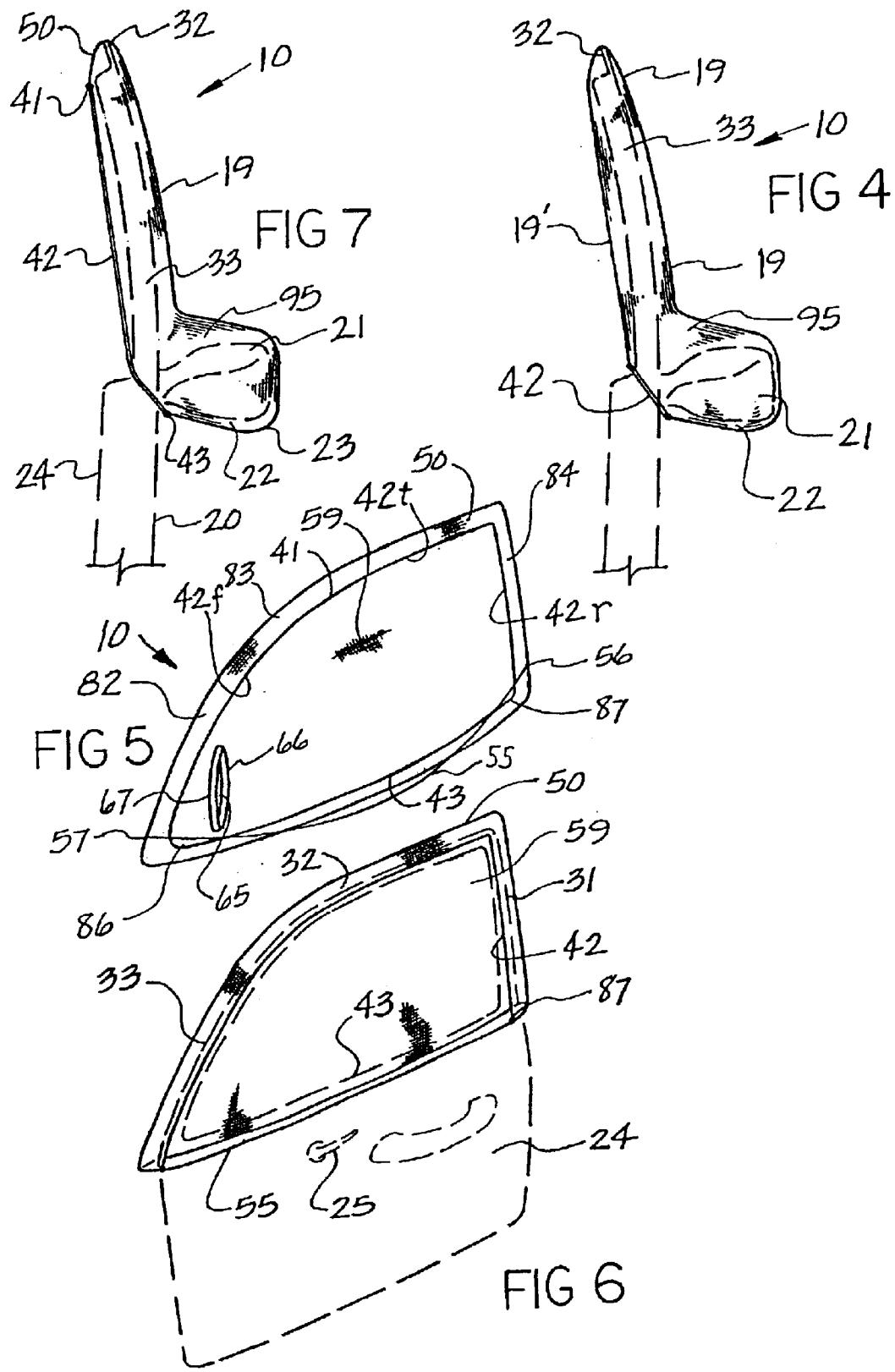

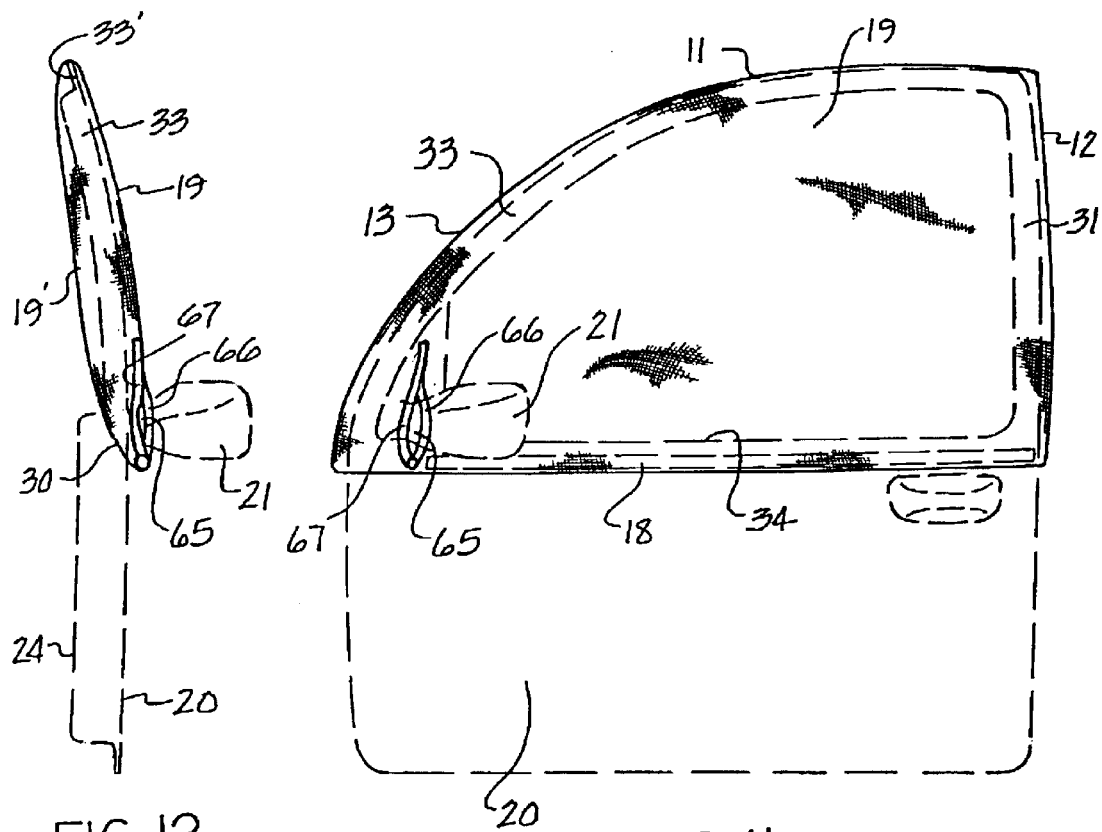
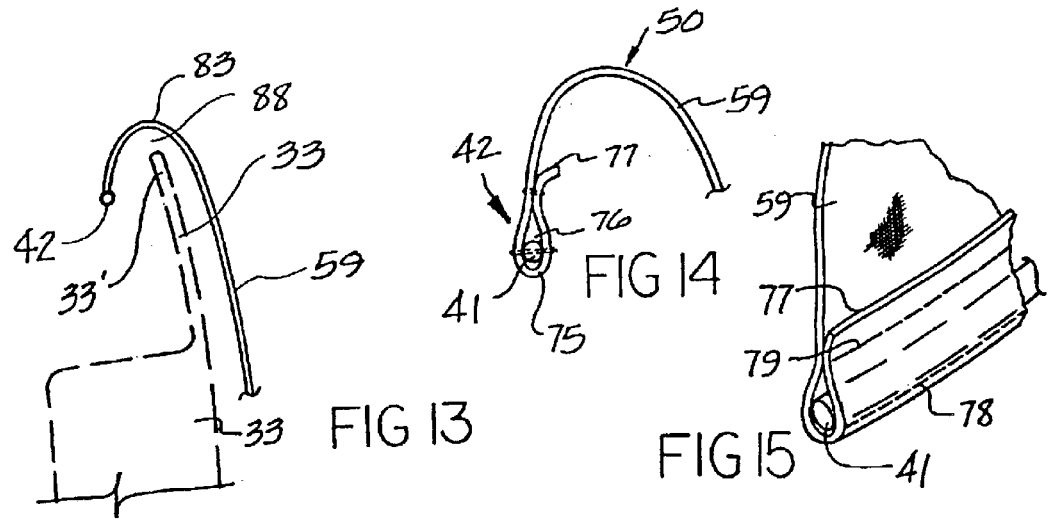

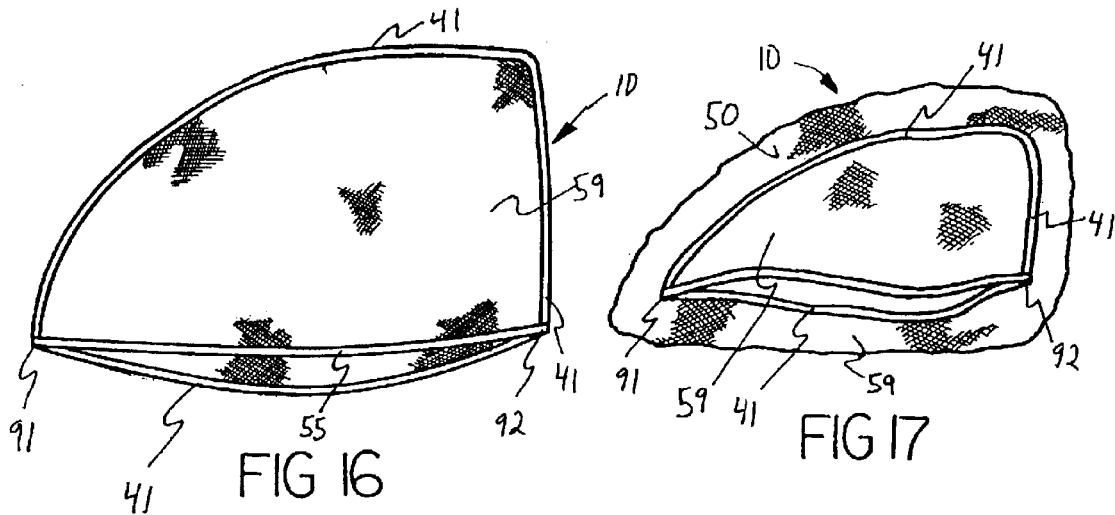
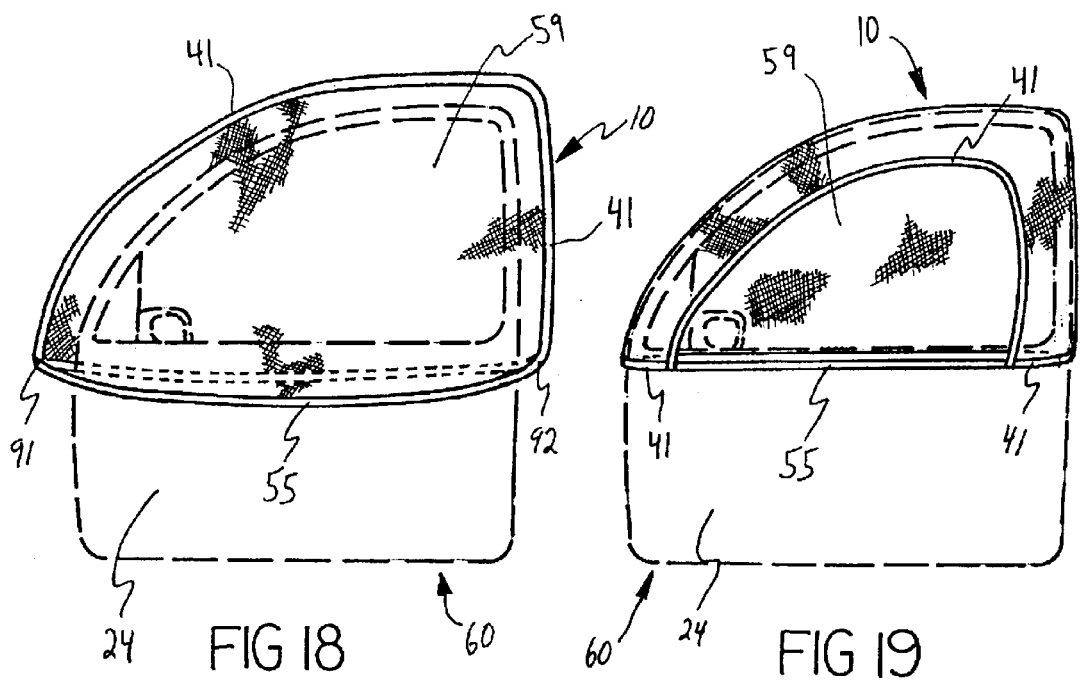

TEMPORARY REPLACEMENT WINDOW

BACKGROUND OF THE INVENTION

Referring now to U.S. Pat. No. 5,879,048 (Tower), a restraining net is shown that is adaptable for use with an automobile window. Similar methods of installing a restraining net, and the restraining net itself are similarly claimed and described in U.S. Pat. No. 5,713,624 (Tower). The restraining net is comprised of a single strip of material which is folded over the door window frame, and secured into position using a belt attachment means. Additionally, a single piece of mesh material is shown, in which a single piece of mesh material is secured to the interior side of the automobile door, using connecting straps. These straps are required to encircle the door from top to bottom, and side straps are also required.

Referring now to U.S. Pat. No. 5,957,524 (Feder), an automobile window insert is shown. In Feder, a portion of the window is effectively replaced. However, the shape and methods of the replacement piece in Feder are substantially different in benefits they offer, as compared with the present invention. There is no contemplation in the present invention for a portion of the window frame to remain open. Further, there no realistic value in the Feder invention to provide a replacement window which completely restricts airflow or objects from passing through a window.

Referring now to U.S. Pat. No. 5,570,542 (Cameron), a safety shield window insert is shown. This invention does allow some benefits as a temporary replacement window, however it requires an existing window being in place as part of the support structure. In addition, this particular invention (Cameron) is not readily adaptable to numerous different kinds of window shapes and sizes.

Referring now to U.S. Pat. No. 5,524,694 (Arapis), a protective screen for a vehicle window is shown. This protective screen requires that straps be applied which encircle the door, in order to hold the screen in place. This particular invention (Arapis) does provide an adaptable screen mesh replacement screen, however the means of connecting it to the door of an automobile window frame is cumbersome in the same manner as seen in the Tower patents noted above (U.S. Pat. Nos. 5,713,624 and 5,879,048).

Referring now to U.S. Pat. No. 5,290,086 (Tucker), a window net screen is shown, which provides a protective barrier from rocks and other debris. While this patent shows a mesh material being placed within the open area of an automobile window, it only accounts for a portion of the window area being covered. In addition, this prior art requires an attachment means, and unlike a replacement window being used on a temporary basis, this prior art is a permanent artifact that is incorporated into the vehicle.

Referring now to U.S. Pat. No. 5,035,460 (Huang), a mobile window protector is shown. Various belts and elastic straps are shown, which serve to attach this protective window screen to an automobile. It should be noted, that this particular screen is more adapted to covering existing windows, rather than replacing the window itself. It is inadequate if required to function as a replacement window, where the existing window is missing or has been broken out.

DESCRIPTION OF THE DRAWINGS

FIG. 1 depicts a perspective view of the replacement window, having a bag configuration, as it would appear when positioned over a car door window frame.

FIG. 1a is a partial view of the defined open end of the replacement window shown in FIG. 1, showing an enlarged view of a magnetic strip around the length of the opening.

FIG. 1b is a perspective view of the replacement window as it would appear when placed over an automobile window.

FIG. 2 is a perspective view of the replacement window, showing a magnetic strip around the circumference of the opening, and also showing a mirror extension pouch.

FIG. 3 is a view of the front of the replacement window, shown fitted over a car window frame, with the extension pouch also encircling a side mirror.

FIG. 4 is a view of the front of the replacement window, in which the mouth opening is placed around the door window frame, and where the replacement window is able to define sufficient volume so as to contain a side view mirror.

FIG. 5 is a perspective view of the replacement window, as it would appear prior to being placed over a door window frame.

FIG. 6 is a perspective view of a replacement window, in which an elastic band defines the mouth of the replacement window, and where said replacement window is shown encircling the top and side portions of the automobile window frame.

FIG. 7 is a frontal view of an automobile door and window frame, showing the replacement window positioned, or cupped, over the top edge and side edges of the window frame, and where the elastic strap is visible as it encircles the interior side of the automobile window.

FIG. 11 is a side view of a replacement window, having a mirror slit that is secured at the bottom using a snap means, with a magnetic strip used on the outside/exterior side of the replacement window, so as to hold the bottom edge of the replacement window against the automobile door.

FIG. 12 is a cross-sectional view of the replacement window, shown positioned over a door window frame, where a side view mirror is protruding through the mirror slit, and where the mirror slit is closed around the bottom side of the mirror using a snap means.

FIG. 13 is a cross-sectional view of a cupped end and elastic band, shown encircling a window frame edge.

FIG. 14 is a cross sectional view of a temporary replacement window and elastic band positioned within a sleeve, defined by the replacement window.

FIG. 15 is a perspective cross sectional view of the temporary replacement window that has had its terminating edge folded over, with an elastic band that is attached along its length to the temporary replacement window material.

FIG. 16 is a side view of a single sheet replacement window, having a separate elastic strap attached at each end to the bottom corners of the sheet, where the elastic is stretched.

FIG. 17 is the replacement window shown in FIG. 16, in which the elastic has been allowed to return to a relaxed, or constricted, state.

FIG. 18 is the replacement window of FIG. 16 shown, as seen from the internal side of the automobile door, where the elastic is stretched.

FIG. 19 is the replacement window of FIG. 17, as seen from the external side of the automobile door, where the elastic has been allowed to constrict, so that the sheet is across the outside of the window frame, and is cupped around the frame peripheral edges, with the elastic being on the inside of the window frame, along with the separate elastic strap.

SUMMARY OF THE INVENTION

Figure 8:
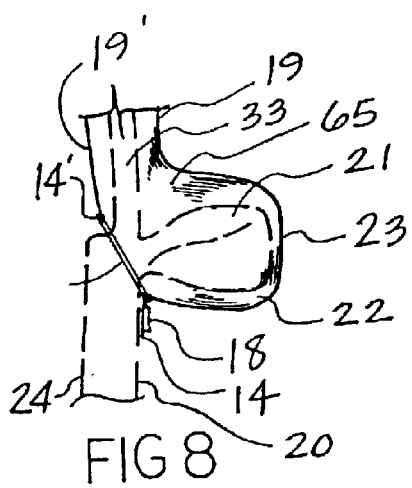
FIG. 8 is a front view of a replacement window, in which the external mouth edge is pressed against the exterior metal surface of a car door, using a magnetic strip.

This invention is intended to fulfill the temporary requirements as a replacement window for an automobile or truck door window. Prior art has relied principally on duct tape and plastic garbage bags, along with somewhat permanent replacement means that are not adaptable to a variety of vehicles. This invention is capable of adapting to a plurality of vehicle window frame designs, sizes and shapes.

This replacement window is usable on doors that have a structural window frame surrounding the entire window. The window frame provides the support for the structural integrity of the temporary window shape. The replacement window is typically comprised of a flexible plastic sheeting, or may also be a mesh-like material. Plastic sheeting or mesh is formed into an inverted bag shape, having a defined mouth opening, that is able to accommodate the window frame portion of the door. In place of a bag configuration, a single layer of mesh material may be used across the window frame area, with cupped edges effectively gripping the window frame around the perimeter.

When using the bag configuration, the replacement window is positioned above the door window frame, while the door is open. The replacement window is then lowered down over the window frame, inserting the window frame portion through the mouth of the replacement window. The replacement window is urged downward, so that the window frame portion of the door is completely disposed within the confines of the body, or bag portion, of the replacement window.

The replacement window is then secured to the door, using a variety of alternative methods. Generally, an elastic strap is secured around the mouth opening of the replacement window, and will restrict the mouth opening. This will allow the mouth opening to conform to the particular shape and outer surface area of the bottom portion of the window frame, and also the top portion of the door. Other means to secure the replacement window may also be used, such as adhesives, magnetic strips, and any other means commonly known.

The replacement window may have an additional area defined as a pocket or mirror pouch, that is able to accommodate a vehicle's typical side rear view mirrors. If a side rear view mirror is present, the replacement window may be secured underneath the mirror, effectively using the mirror to assist in maintaining the position of the replacement window on and around the window frame.

Optimally, the replacement window will have a defined mirror slit, that is able to be closed when not in use. If a mirror is present, the slit edges are urged apart, to allow the insertion of a side view mirror through said slit. The mirror slit may be defined as two opposing slit edges, that extend from the bottom side edge upward, and may be secured at the bottom using common attachment means such as Velcro and snaps.

There are various embodiments on this invention, depending on the door frame shape and size, as well as the needs of the consumer. The bag shape, may comprise two distinct sheets of transparent, or semi transparent materials, to occupy the general area within the window frame where the glass used to be. In some instances, the consumer may desire a mesh material, instead of transparent plastic, and the replacement window may be configured so that the mouth portion cups around the window frame, so that only a single layer or sheet of material is present within the window frame area. Similarly, plastic sheeting may also be used as a single sheet configuration. This improves the optical quality and distortion, as compared with a dual sheet replacement configuration offered in the bag configuration.

Mesh may be desirable, over plastic sheeting, in situations where airflow is desired through the area occupied by the replacement window. Examples of such situations would be where the vehicle is parked during warmer or pleasant weather, or in slow-moving traffic, in which the window would normally be rolled down. If the mesh embodiment of this intervention is used, it also functions as an insect screen, allowing a properly operating window to be rolled down, while preventing unwanted insects such as mosquitoes from entering into the vehicle.

It is therefore an object of this invention to provide a temporary replacement window, that is usable on vehicles having a rigid window frame defined by the vehicle door.

It is a further object of this invention to provide a replacement window, that is capable of being used with a minimally intrusive means of securing said temporary replacement window to the vehicle.

It is a further object of this invention to provide a replacement window, that allows use with multiple vehicle door designs and styles.

It is a further object of this invention to provide a replacement window, that allows it to be used with projecting side rear view mirrors.

Accordingly, it is the object of this invention to provide the means whereby automobile windows may be temporarily replaced, until a more suitable permanent replacement can be obtained.

It is a further object of this invention to provide a means whereby a temporary screen or mesh may be placed across the opening defined by a typical automobile window, so as to provide protection from insects and other small objects, that might otherwise enter into the vehicle through an open window frame.

It is a further object of this invention to provide a temporary replacement that is capable of accommodating various automobile door window frames, and their various side mirror configurations.

DESCRIPTION OF THE PREFERRED EMBODIMENT

Referring now to FIG. 1 and FIG. 2, a temporary replacement window 10 is shown, positioned directly above a typical automobile door 60, having a rigid window frame 61. Window frame 61 is comprised of the top surface 34 of the automobile door body, and further defined by front frame support 33, top frame support 32, and rear frame support 31, which are joined together to form a generally rectangular area between them, and which defines an opening that a window would typically occupy. Variations as to angles and curvature of the window area are typically designed according to the particular vehicle specifications. In a situation where the glass window is broken out, or for some reason unable to occupy its intended position, a replacement barrier may be needed on a temporary basis. This temporary replacement window 10 fulfills that need.

The temporary replacement window 10 has several embodiments, which conform to various window frame 61 configurations. In each embodiment, a sheet of material is placed so as to cover the open area defined by the window frame 61.

The First Embodiment—Inverted Bag Configuration

The first embodiment is shown in FIGS. 1–4 and 8. In addition, FIGS. 11 and 12 also depict this configuration. In this first embodiment, the replacement window 10 comprises an inverted bag-like shape and design. Referring again to FIG. 1, the replacement window 10 is comprised of two sheets of material 19 and 19', which have a generally rectangular shape, and which are attached to each other along their respective front side edges 13, their top side edges 11, and their rear side edges 12. The bottom side edges 14 and 14' define an opening that defines the mouth 62 of the replacement window 10. The mouth is defined by the bottom edges 14 and 14', which are joined to each other at the front bottom corner 17 and the rear bottom corner 16. In this first embodiment, since the intended use of this invention is to function in a manner similar to an actual window, the replacement window 10 is constructed out of a transparent or at least translucent material, that is fairly impervious to water and air. The resiliency of the plastic may vary from flaccid to rigid. Where a rigid plastic is used, the shape of the plastic should conform closely to the outer shape and configuration of the window frame over which it is being placed.

This temporary replacement window 10 is also able to accommodate a rear view side mirror. FIG. 1 depicts a mirror slit 65, which is defined by two slit edges 66 and 67. Although not required, slit edges 66 and 67 may be comprised of reciprocal Velcro edges, that are able to be attached to each other. In the embodiment shown in FIG. 1, the slit 65 extends perpendicularly from the bottom side edge 70 into the central area of the replacement window 10. Slit edges 66 and 67 may be joined together using any means typically used to join adjacent sheets of material. This may comprised snaps, diverse, books, any other types of hardware or attachment means.

An alternative material may be used, in place of the plastic sheeting described above. The alternative material will comprise two mesh-like sheets of material that used in place of the plastic sheets 19 and 19' described above. When mesh material is used, the construction of the temporary replacement window 10 is done in the same manner for the mesh as is described above for plastic sheeting. It should be understood that these two materials, being plastic sheets or mesh, comprise the "sheets" 19 and 19' described above. In addition, the combination of both materials may also be used, so that the sheets 19 and 19' both restrict airflow and water in part, while other areas of the sheets 19 and 19' are comprised of mesh material, which allow air to pass through the mesh portion of the replacement window 10.

The act of placing the temporary replacement window 10 onto the vehicle door frame 61 is a simple procedure. Referring again to FIG. 1, the replacement window 10 is positioned above the window frame 61 and is lowered over said window frame 61, so that the window frame 61 passes through mouth opening 62 with the window frame moving completely into the confines of the replacement window 10. As is also shown in FIG. 1, the replacement window 10 is able to be moved downward, so that top side 11 is able to rest on window frame top support 32. The replacement window front side edge 13 is adjacent to window frame front support 33, and replacement window rear side edge 12 is adjacent to window frame rear support 31. Sheet portion 19 will be on the exterior side 20 of the door 60, and sheet 19' will be on the interior side 24 of the door 60. As is also shown in FIG. 1, if a side rear view mirror 21 is present, the mirror 21 is positioned through the slit 65, with edges 67 and 66 encircling the mirror 21.

The means of attaching the replacement window 10, as depicted in FIG. 1, to the automobile door 60, may comprise any means commonly known and understood in the art. In this first embodiment, as shown in FIG. 1, the securing of the replacement window 10 is accomplished through two basic means. One typical means is that an elastic strip 43 is incorporated into the bottom edges 14 and 14' of replacement window 10. The elastic strip 43 is shown more clearly in FIGS. 2, 3, 4 and 8. FIG. 1 shows a replacement window 10, in which elastic strips are not used. The external bottom side edge 14 may be secured to the external side 20 of the vehicle door 60 using tape or other adhesive means. The adhesive means may be a separate tape strip, or adhesive may be incorporated directly into the bottom edge area 14 of the replacement window 10. Since adhesive means tend to leave an undesired residue behind after removal, and since this replacement window 10 is intended to only function on a temporary basis, other means of securing the bottom edge 14 to exterior surface 20 of the automobile door 60 may be desired.

Referring now to FIG. 1a, a magnetic strip 18 is incorporated into the bottom edge 14 of temporary replacement window 10. As FIG. 1a shows, a magnetic strip 18 may be made attached along the bottom edge 14. A second magnetic strip 18' is also attached along the bottom edge 14'. Both magnetic strips 18 and 18' may be used either together, or singularly. In addition, as is also shown in FIG. 2, the magnetic strip may be also used in conjunction with the elastic strip 43. The use of the magnetic strip 18 is accomplished as is more readily shown in FIG. 8. The magnetic strip 18 is fixed on the external surface of the replacement window external sheet 19, and when placed in close proximity to the metallic automobile door external surface 20, this will allow sufficient magnetic attraction so that the magnetic strip 18 will be held in place against door surface 20. As is also shown in FIG. 8, the magnetic strip 18 does not need to directly contact the vehicle external surface 20, as the replacement window sheet 19 acts as a cushion between said magnetic strip 18 and external door surface 20. Therefore, a magnetic strip 18 exhibiting significant magnetic attraction may be used, without danger of scratching or causing damage to the door external surface 20, while the replacement window 10 is in place. A benefit of using a magnetic strip 18 is that the bottom edge 14 of the replacement window 10 is held in place along the entire length of bottom edge 14. This is particularly important when the vehicle is moving, and air is passing rapidly over the replacement window 10. When the vehicle is moving, if the bottom edge 14 is moved away from the door 60, a ballooning effect can occur when onrushing air enters into the interior of the replacement window 10. In such a situation, the replacement window 10 can be torn away or damaged. The magnetic strip 18 prevents this from occurring.

Figure 10:
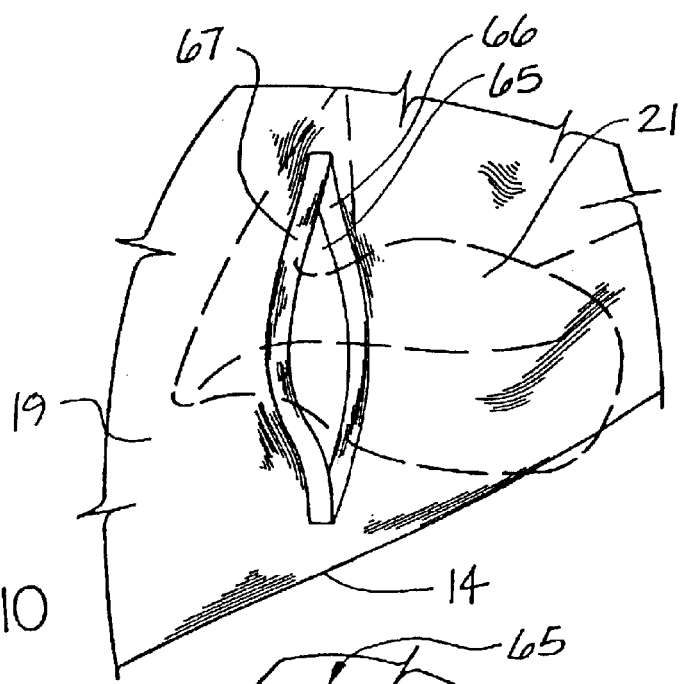
FIG. 10 is an enlarged view of a mirror slit, where said mirror slit does not extend to the bottom side edge of the replacement window, and where a mirror is shown positioned through the mirror slit.
Figure 9:
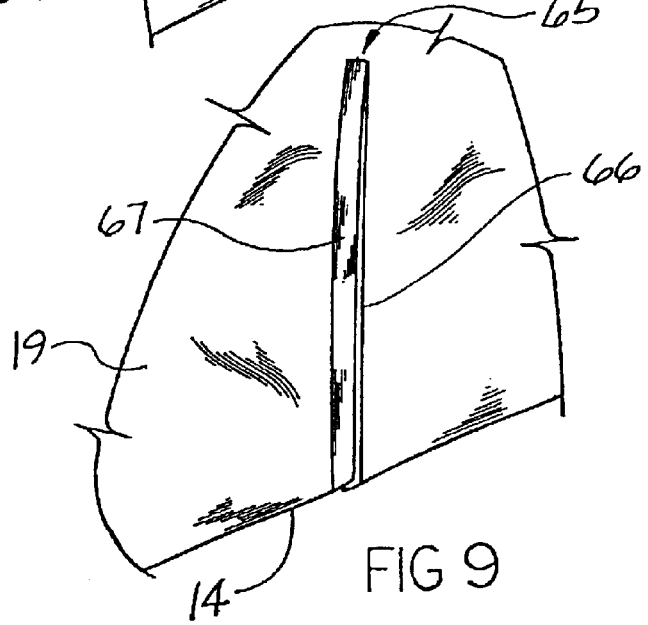
FIG. 9 is a view of the mirror slit, showing overlapping Velcro strips used for closure, where said mirror slit extends to the bottom edge of the replacement window.

Referring now to FIG. 9 and FIG. 10, the mirror slit 65 is shown in more detail. As FIG. 9 shows, the mirror slit 65 is not being used. In order to prevent unwanted airflow through the slit 65, a means to secure edges 66 and 67 is used. FIG. 9 is intended to show the manner in which two reciprocating Velcro strips are used to secure edges 67 and 66 to each other. As FIG. 9 also shows, the mirror slit 65 extends from the central part of sheet 19 to its bottom edge 14. Edges 66 and 67 are parallel to each other and have a uniform length shared between them.

As is seen in FIG. 10, a mirror 21 has been placed through slit 65. Edges 66 and 67 are formed around the mirror 21, so as to minimize any open area of the slit 65 around mirror 21. As FIG. 10 shows, side edges 66 and 67 are flexible, and are able to attach to each other. Again, as referenced above, edges 66 and 67 are preferably Velcro strips. Other attachment means may be used, such as snaps, hooks, zippers and other similar means. As FIG. 10 also shows, the slit 65 and does not extend to the bottom edge 14, as it does in FIG. 9. In this manner, the body of the sheet 19 provides additional support around the bottom of mirror 21, and does not rely solely on the ability of side edges 66 and 67 to attach to each other.

Another variation to the embodiment described above, comprises a defined side view mirror pouch 23, as is shown in FIG. 2. This pouch 23 comprises a defined bulge in the external sheet 19 of the replacement window 10, creating a mirror cavity 22 which is sufficient to accommodate the side view mirror 21. Use of this pouch 23 allows the external sheet 19 to be maintained in a close contact position against the window frame 61. As FIG. 4 shows, when no pouch 23 is specifically defined and formed into sheet 19, an undesired air volume 95 may be present between the mirror 21 and door window frame 33. This can those some problems during driving at higher speeds, since the air volume cavity 95 presents greater surface area against the onrushing air during driving. Further, a comparison between FIG. 4, and FIGS. 3 and 8 shows a significant reduction of the air cavity 95, when the pouch 23 is used. Use of the mirror slit 65 tends to obviate the problems associated with an air cavity 95 during driving.

FIG. 4 depicts a temporary replacement window 10, in which an elastic strip 43 comprises the entire length of the mouth of said replacement window 10. As FIG. 4 shows, there is no mirror slit 65 used, nor is there any mirror pouch 23 used. The embodiment shown in FIG. 4, relies entirely on the flexible shape of the replacement window 10 to conform to the protruding mirror 21. No defined pouch 23 is available, as shown in FIG. 7, therefore a significant airspace 95 is present. FIG. 7 depicts the replacement window 10, in which only a single sheet of material is used, as compared to the double sheet configuration shown in FIG. 4. The single sheet configuration will be discussed in more detail below.

FIG. 8 indicates the benefits of the mirror pouch 23, especially when compared directly to FIG. 4. As FIG. 8 shows, the pouch 23 surrounds mirror 21, with only a small volume of airspace 22 directly around the mirror 21. In addition, a minimal airspace 95 is present between the mirror 21 and door window frame 33. Since the minimal airspace 95 is defined by the external sheet 19 and the door window frame 33, the more closely the pouch 23 can match the actual exterior shape of mirror 21, and the less volume of airspace 95 will be present.

As is also shown in FIG. 8, an elastic strip 43 assists in holding the bottom edge 14' against door window frame 33. The elastic strip 43 also encircles the front edge of the door, edges attached in close proximity to the bottom edge 14. The external side of the replacement window 10 is using a magnetic strip 18, that is located along the bottom edge 14 of sheet 19. The magnetic strip 18 is attracted to the exterior side 20 of the door, and maintains the position of bottom edge 14 against exterior side 20.

FIG. 2 also shows an elastic strip 43 encircling the mouth of the replacement window 10. The elastic strip 43 is incorporated into the bottom edge area 14 and 14'. As FIG. 2 also shows, the elastic strip 43 may be used in conjunction with a magnetic strip 18 along the length of bottom edge 14. The bottom edge 14 may utilize the magnetic strip 18 along its entire length, while bottom edge 14 may utilize an elastic strip 43.

The Second Embodiment—Single Sheet

A second embodiment of this intervention is shown in FIG. 5-7. FIGS. 17 and 19 also depict this embodiment. In this embodiment, only a single sheet of material is used across the area defined by the window frame 61. The second embodiment is particularly useful when a mesh material is used, instead of the plastic sheeting, but both materials are usable and provide suitable temporary replacement for window glass. The advantages with the second embodiment is that a single temporary replacement window 10 may suitably be used with a variety of doors 60 and window 61 configurations. This second embodiment of this invention may comprise plastic sheeting, and this description should in no way indicate or limit the scope of this invention to only mesh in the second embodiment. In fact, the use of plastic sheeting may be desirable using this second embodiment, since only one layer of plastic is used across the window frame area, and the optical clarity is enhanced, as compared to a replacement window using multiple sheets of plastic.

The second embodiment is shown in FIG. 5, as it would appear prior to being placed on a door window frame 61. FIG. 17 also shows this embodiment, in which no mirror slit 65 is defined. FIG. 17 depicts the window 10 with an elastic strap 55, and with the window 10 in a relaxed shape. In this second embodiment, a mesh material is shown, however other materials and plastic sheeting may also be used. For clarification, the external sheet in the second embodiment is designated as 59. It occupies the same location and orientation as sheet 19 does in the first embodiment described above. Referring again to FIG. 5, external sheet 59 has defined rolled or "cupped" exterior edges 50. These rolled exterior edges 50 are more clearly seen in the upper portion of the cross-sectional view as shown in FIG. 7. FIG. 17 also is intended to show the rolled exterior edges 50.

As FIG. 5 shows, this second embodiment of the replacement window 10 generally comprises a planar sheet of material, that has at least three contiguous sides defining rolled exterior edges, being the top side edge 42t, rear side edge 42r, and front side edge 42f. Positioned within the terminating edge of the rolled exterior edges 50 is an elastic strap 41, which serves to constrict the length of edges 42f, 42t and 42r of the temporary replacement window 10, to a length less than the peripheral dimensional length of the automobile window frame 61.

Referring also to FIG. 14, the rolled exterior end 50 is able to be cupped around window frame 61 (not shown), with the elastic band 41 positioned within the tubular cavity 76. Said tubular cavity is created by arching the terminating end 77 of material 59 back on itself, to create said tubular cavity 76 along the length of the terminating end 77.

Referring also now to FIG. 15, the terminating ends 77 of material 59 are inverted with respect to the planar configuration of the material 59, so that a portion of the material is looped around the length of an elastic band 41. The material 59 and elastic band 41 are fixed in position to each other, using any means commonly known in the art to attach elastic bands 41 to any sheet of material 59. FIG. 16 depicts the use of stitching 79, using thread or other resilient cord-like material, that moves through the material 59, to attach the terminating end 77 of material 59 to the side surface of the material 59. A second set of stitching 78 moves through the looped material 59 that covers the elastic cord 41, with said stitching 78 also moving though the elastic cord 41, so as to fix the cord 41 length in relation to the material 59.

As is shown in FIG. 5, and also in FIG. 13, the sheet material 59 has a front cupped edge 82, a top cupped edge 83, and a rear cupped edge 84, where said cupped edges 82, 83 and 84 define a cavity 88 that is able to receive the width of the door frame 33, and also with respect to door frame 32 and 31 (not shown in FIG. 13). An elastic band sleeve 42 is attached to the terminating edge of the three cupped edges 82, 83 and 84. This elastic band 42 sleeve allows the elastic band 41, contained therein, to constrict the diameter of the opening of replacement window that is placed over the window frame 61, with the elastic band 41 having sufficient restricting properties in which the elastic band 41 defines an opening that is less than the exterior surface circumference of the window frame 61. This embodiment of the replacement window 10 is held in position therefore by the cupped edges 82, 83 and 84, and by the elastic band 41.

The bottom area of the replacement window 10 for this second type of embodiment, is held in place typically using a second retaining strap 55, which is connected at one end to the front bottom corner 86, then on its other end to the rear bottom corner 87. The retaining strap is positioned so that it lays across the top surface 34 on the interior side of the door 60. The retaining strap may be elastic, so that it provides a constant level of tension on the bottom area of the replacement window 10 on the exterior surface, against the exterior surface of the door 60. A bottom elastic band 41 may also be used, so that the constricting properties of the elastic band 41 completely encircle the window frame 61. As FIG. 19 depicts, the elastic band 41 encircles the window frame 31, 32 and 33, and also traverses the external side of the vehicle door 60. The restraining strap 55 provides tension across the interior side 24 of the vehicle door 60.

As FIG. 5 shows, this second embodiment may utilize a mirror slit 65, having characteristics similar to that as described above when referring to FIGS. 9 and 10. As FIG. 6 shows, this replacement window embodiment may be devoid of any mirror slit 65, depending on the preference on the user, and the configuration of the automobile rear view mirror 21. Where the mirror slit 65 is used, it will also provide an additional restriction against movement along the planar surface of the mesh or plastic sheeting being used, due to the fact that the mirror 21 provides an obstruction that the encircling elastic cord 41 can maintain its position through.

For complete clarification, FIGS. 16 through 19 are provided, depicting the single layer configuration of the temporary replacement window 10. FIG. 16 depicts the single sheet configuration. A sheet of material 59, having either a porous mesh or solid plastic composition, is formed into a generally rectangular shape, approximating the configuration of an automobile door. As is shown also in FIG. 14, an elastic cord 41 is situated in a linear cavity 76, defined by looped roll 75. The looped roll 75 is created where the edges of the sheet 19 have been looped 180 degrees back onto itself, with the peripheral edge 77 being thus attached to the side edges of sheet 59. The resulting cavity is able to receive the elastic cord 41, which has a resting restriction length less than the outer circumferential edge of the sheet 59, and also less than the target window frame of the automobile that it will cover. The elastic cord 41 may be sewed directly to the material comprising the sheet 59, or in a free moving cord, as shown in FIG. 14. FIG. 15 depicts the cord 41 situated in the linear cavity 76, where the peripheral edges 77 have been stitched to the sheet 59, and also where the cord itself is then stitched, or attached, to the sheet loop 75.

FIG. 16 shows the elastic cord 41 stretched, so that the peripheral edges of the sheet exceed the targeted window frame. FIG. 18 depicts the temporary replacement window of FIG. 16 placed against the target automobile window. In each FIGS. 16 and 18, the elastic strap 55 is shown, attached at each end to the respective bottom corners 91 and 92 of sheet 19. FIG. 18 shows the internal side view of the vehicle door 60, with the elastic strap 55 positioned against the inside of the door, while the sheet 19 is situated on the outside of the door and window frame. The window frame is thus situated so that it protrudes through the opening defined by the elastic strap 55 and the sheet 19.

FIG. 17 depicts the relaxed configuration of the replacement window 10, where the elastic cord 41 has decreased in its linear length, so that the circumference defined by it is less than the peripheral edge of the target automobile window. The effect of the constriction is to create a cupping effect, as shown in FIG. 11, where the cupped edge 50 creates a cavity area beyond that defined by the relaxed elastic 41. In this same configuration, when the elastic is allowed to constrict around a door frame, the result is as shown in FIG. 19, where the sheet 19 covers the opening of the window frame, with the cupped edges 50 covering the edges of the window frame, so that the window frame is contained within the cavity defined by the cupped edges. The relaxed elastic 41 prevents the sheet 19 from moving off of the window frame.

The separate elastic strap 55 and bottom edge of sheet 59 and its elastic cord 41, jointly squeeze the portion of the window frame protruding upward from the actual automobile door 20. This squeezing effect prevents the sheet 19 from moving upward, and maintains coverage of the open window space. Magnetic strips 18, as shown in FIG. 2, may also be used in place of, or in conjunction with, the elastic strap or cord 41, to assure stable attachment and position to the door.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. The temporary replacement window, having a defined slit that is defined by side edges that allow attachment to each other, so as to fit closely around a protruding rear view mirror, so as to limit the available airflow through said slit, comprising:

a. two sheets of material, which are attached to each other along their respective front side edges, their top side edges, and their rear side edges, with the bottom edges defining a mouth that is of sufficient size to allow the insertion of a vehicle door window frame;

b. a window slit, defined perpendicularly from the bottom side edge of the sheet of material comprising an outer sheet, where said slit is defined by reciprocal, where said edges are able to be attached to each other to close the slit at multiple points along its length.

2. The temporary replacement window, as recited in claim 1, in which the slit further comprises defined flexible side edges, which may be secured firmly around a protruding rear view mirror so as to limit airflow through the slit, where the side edges comprise Velcro reciprocal strips.

3. The temporary replacement window, as recited in claim 1, in which the slit further comprises defined flexible side edges, which may be secured firmly around a protruding rear view mirror so as to limit airflow through the slit, where the side edges are joined together using reciprocal snaps.

4. The temporary replacement window, as recited in claim 1, in which the slit further comprises defined flexible side edges, which may be secured firmly around a protruding rear view mirror so as to limit airflow through the slit, where the side edges are joined together using reciprocal hooks.

5. The temporary replacement window, as recited in claim 1, in which the slit further comprises defined flexible side edges, which may be secured firmly around a protruding rear view mirror so as to limit airflow through the slit, where the side edges comprise a zipper means.

6. The temporary replacement window, as recited in claim 1, in which the sheets are constructed of plastic sheeting.

7. The temporary replacement window, as recited in claim 1, in which the sheets comprise a mesh material.

* * * * *